INVENTOR
MICHAEL G. THASSY
BY Robert B. Gin ATTY.

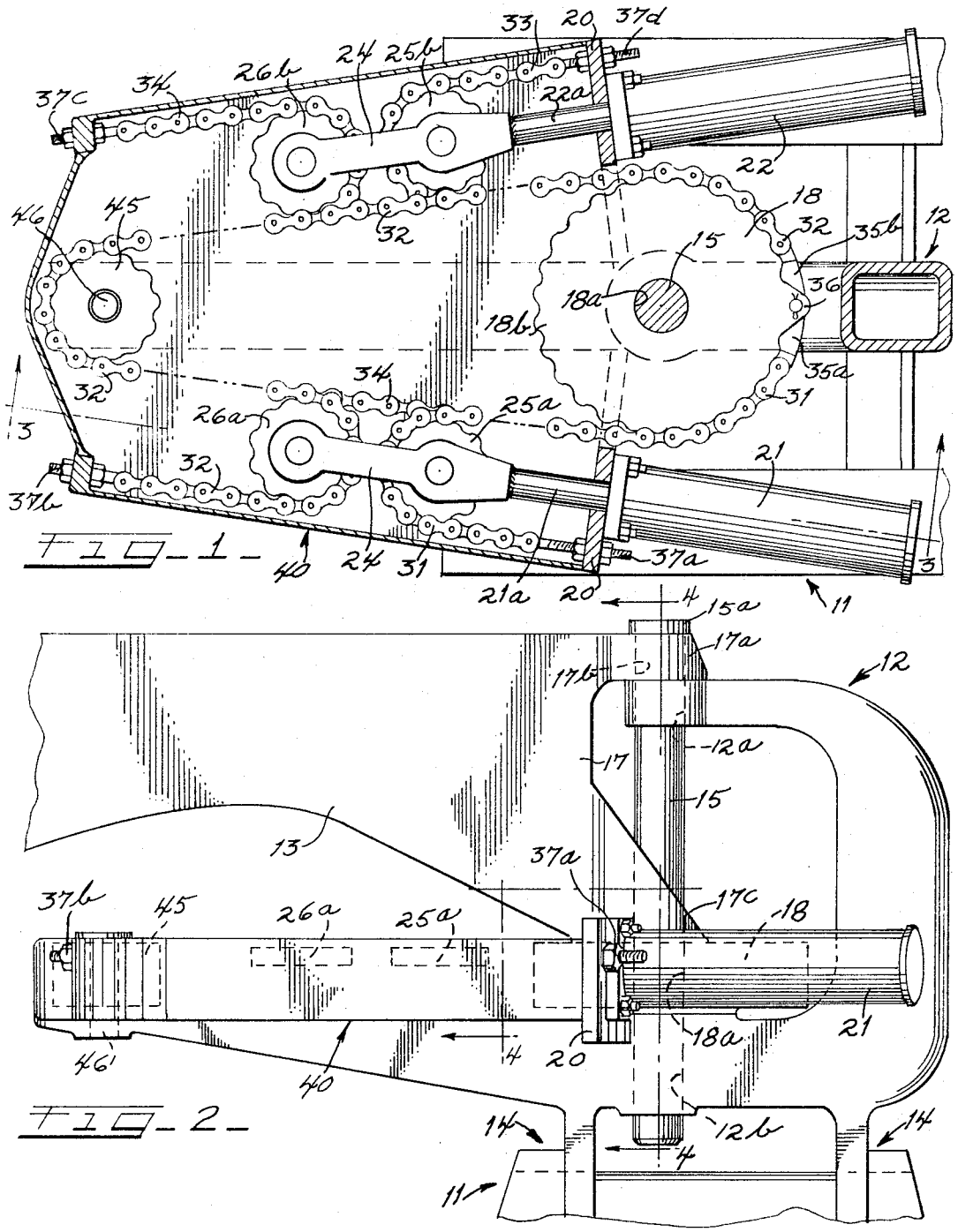

3,326,316
CONSTANT TORQUE STEERING SYSTEM WITH DOUBLE ACTING HYDRAULIC CYLINDERS
Michael G. Thassy, Melrose Park, Ill., assignor to International Harvester Company, Chicago, Ill., a corporation of New Jersey
Filed June 22, 1965, Ser. No. 466,035
8 Claims. (Cl. 180—79.2)

This invention relates to steering systems for automotive vehicles of the heavy duty type. More particularly it relates to a hydraulically actuated power system for steering a tractor-drawn trailer unit such as a dump wagon, an earth mover, a scraper, etc., and employing a D-type fifth wheel-gooseneck mechanism enabling oscillation of the fifth wheel about a horizontal axis and turning of the vehicle about a generally vertical axis.

As is well known in the art, there are presently a number of steering structures in use in the field, however these devices have attendent disadvantages which produce undesirable results. These structures include various power transmission mechanisms driven by hydraulic cylinders associated with the hydraulic system of the tractor; some employing cables and pulleys, others chains and sprockets, with a drum for providing relative rotation between a fifth wheel and gooseneck. But these, while accommodating oscillation about a horizontal axis and enabling turning through an angle of 180 degrees, have been characterized by jerkiness in the steering operation due to lack of coordination in the operation of the hydraulic cylinders and consequent failure to provide for delivery of constant torque by the power source.

It is an object of the invention to provide such a system including mechanism delivering steady torque during driver actuation of the hydraulic power source; i.e., hydraulic cylinders.

Another object of the invention is to provide in such a mechanism an arrangement of a plurality of double-acting hydraulic cylinders in pairs and so interconnected as to provide coordinated pulling and pushing upon the mechanism by the members of a pair thereof, respectively.

A further object of the invention is to provide in such a system a mechanism including an arrangement of one or more pairs of hydraulic cylinders associated with a steering drum concentric with a king pin, and having axes in different horizontal planes convergent toward an opposite member on the tractor.

An additional object of the invention is to provide such a system including a steering drum accommodating a plurality of power means in predetermined mathematical relation with the power sources.

Other objects and advantages of the invention will appear from the drawings and the description which follows.

Referring to the drawings,

FIG. 1 is a fragmentary diagrammatic plan view of an embodiment of the invention partially broken away;

FIG. 2 is a side elevation of the arrangement shown in FIG. 1;

Figure 3:
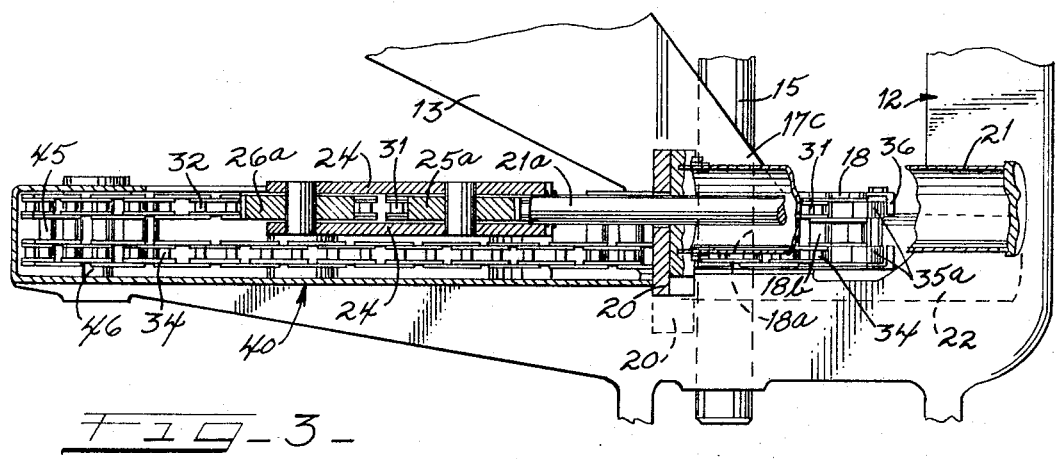
FIG. 3 is a sectional view along the line 3—3 of FIG. 1.
Figure 4:
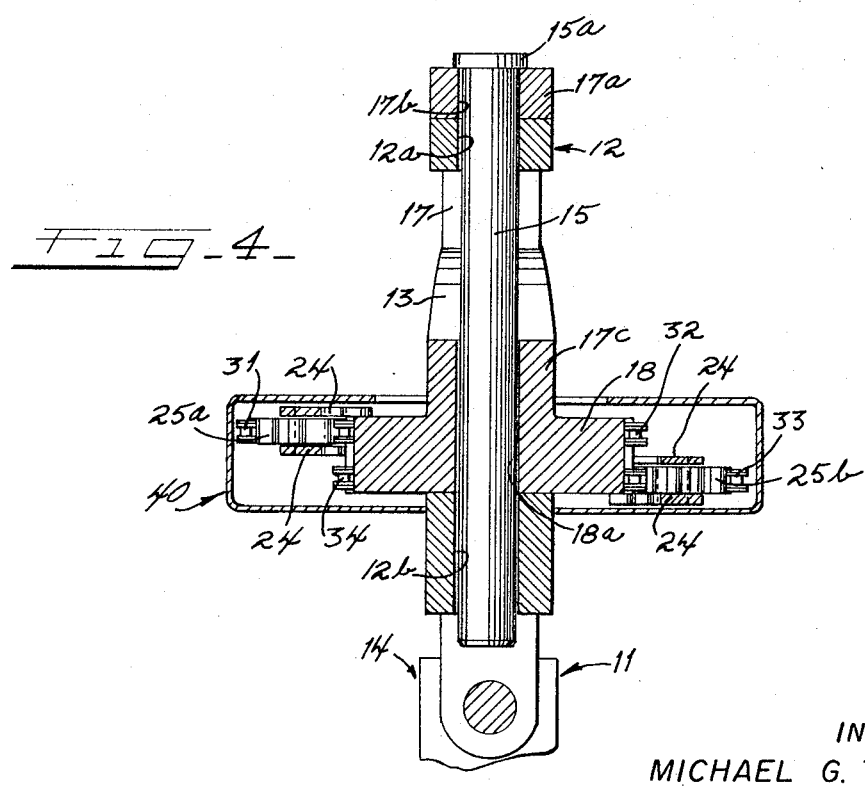
FIG. 4 is a sectional view along the line 4—4 of FIG. 2.

As illustrated in the drawings, a tractor 11 of the two-wheel type has a D-type fifth wheel 12 in pivotal relation about a generally vertical axis with a gooseneck 13 arranged for connection in a conventional manner with a trailer unit (not shown). Fifth wheel 12 is mounted on the tractor 11 in a conventional manner at 14, 14 for oscillation about a longitudinally extending horizontal axis disposed medianly thereof. The arrangement is such as to enable the absorption of torsional forces encountered in the turning of a compound vehicle of the type involved, due to variations of terrain or other reasons, and angling of the components through approximately 180° about the generally vertical axis of the king pin 15.

Fifth wheel 12 and gooseneck 13 are arranged for relative rotation about the generally vertical axis of a king pin 15. Gooseneck 13 has an adapter portion 17 with an upper extension 17a having a bore 17b for receiving the upper end portion of king pin 15 in pivotal relation and a lower projection 17c terminating in a steering drum 18 which has a central bore 18a for receiving a portion of king pin 15 for relative rotation in bores 12a, 12b of fifth wheel 12. A collar 15a limits movement of king pin 15 along its longitudinal axis.

A bracket 20 carried by fifth wheel 12 supports a pair of double-acting hydraulic cylinders 21, 22 arranged in different horizontal planes on opposite sides of drum 18 and in operative communication with a conventional hydraulic system of the tractor for actuation axially in opposite directions. Rearwardly extending piston rods 21a, 22a of these hydraulic cylinders terminate respectively in a double clevis 24, 24 supporting sprockets 25a, 25b, 26a, 26b, for rotation about a generally vertical axis intersecting the longitudinal axis of their respective cylinders.

Steering drum 18 is provided with a series of vertically spaced sprocket-like portions 18b for receiving a plurality of pairs of steering chains 31, 32, 33 and 34 in driving relation. A chain adapter 35 having opposed portions 35a, 35b for securing end portions of chains engaging sprockets 25, 26 respectively, in their respective planes, is supported by clevis 36 carried by drum 18. Opposite end portions of the chains 31, 32, 33, 34 are attached to take-up devices 37a, 37b, 37c and 37d, respectively, which are supported in spaced relation by the housing 40 of which bracket 20 forms a wall.

An idler 45 arranged for rotation about the generally vertical axis of a shaft 46 supported on fifth wheel 12, and in spaced relation with the axis of the king pin 15, has a plurality of sprocket-like portions for receiving one chain of each pair in vertically spaced relation. Idler 45 is of relatively less diameter than drum 18 and the hydraulic cylinders 21, 22 accordingly are arranged with their axes generally convergent rearwardly toward the axis of idler 45.

It will be noted that chains and sprockets, respectively, are so arranged that each chain and the sprockets with which it is associated will function generally in the same horizontal plane.

Upon driver actuation through conventional means (not shown) of cylinder 21 to rotate steering drum 18 and gooseneck 13 in a clockwise direction (FIG. 1), piston rod 21a is projected to the left thereby actuating sprocket 25a and causing chain 31 to act on its associated sprocket 18b on drum 18 and rotate the latter and gooseneck 13 correspondingly. Simultaneously, sprocket 26a is actuated to relax chain 32 and accommodate the tension thereon caused by such rotation of drum 18.

Hydraulic cylinders are operatively interrelated so that upon driver actuation of cylinder 21 in the manner stated cylinder 22 is reversely actuated to retract piston rod 22a (shift it to the right, FIG. 1) thereby applying tension to chain 34 through sprocket 26b and supplementing the rotative force applied to drum 18 through chain 31. Simultaneous operation of chain 33 occurs in a manner similar to that of chain 32.

It will be readily understood that upon driver actuation of cylinder 22 to cause counterclockwise rotation of drum 18 corresponding operation of cylinder 21 and the associated chains and sprockets ensues.

Thus through concurrent complementary operation of hydraulic cylinders 21, 22 a steady application of torque to the steering mechanism is achieved.

Generally, the fifth wheel with the connected tractor rotates relative to the drum-gooseneck-trailer assembly because of the greater weight and ground friction of the trailer. Further, relative to the ground, the tractor turns more and the trailer turns less, depending on the rolling resistance of the ground to the wheels. In the operation of the steering mechanism however, the results are the same and the principle of steering operation does not change.

It will be understood that the foregoing description is intended as illustrative of but one embodiment of my invention and that there may be a variety of changes in form or structure without departing from the scope of the claims which follow.

I claim:

1. Mechanism for steering a tractor-drawn trailer unit comprising
    (a) a fifth wheel mounted on the tractor for oscillation about a generally horizontal axis extending longitudinally medianly thereof,
    (b) a generally gooseNecked element mounted on the trailer unit and having an end portion supported on said fifth wheel for pivotal movement relative thereto about a generally vertical axis,
    (c) a steering drum on said element and concentric with said axis, said steering drum including means thereon for rotating said drum,
    (d) a source of hydraulic power on said tractor,
    (e) a plurality of double-acting hydraulic power means on said fifth wheel in operative communication with said source,
    said power means being synchronized for opposite actuation simultaneously and arranged to operate under manual control, and
    (f) flexible connecting means operatively connected between said power means and said means on the drum comprising a plurality of pairs of power-transmitting means respectively operative upon said drum in adjustable torque-transmitting relation so that as one of a pair of said means pulls on said drum another thereof correspondingly slackens to allow turning of said drum, with the power-transmitting means so arranged that all of said power means apply torque to said drum simultaneously.

2. Mechanism according to claim 1 in which
    (a) the means on the drum comprise a plurality of horizontally spaced pairs of vertically spaced sprockets arranged for rotation therewith about a common axis,
    (b) the power means comprise a plurality of double-acting hydraulic cylinders in operative communication with a hydraulic power system and having piston rods reciprocable along longitudinal axes disposed in vertically spaced generally horizontal planes,
    (c) a plurality of pairs of sprockets is carried by said piston for relative rotation about horizontally spaced, generally vertical axes respectively intersecting said longitudinal axes,
    (d) a plurality of idler sprockets is arranged for rotation with one another about a common vertical axis,
    (e) said connecting means includes a plurality of power transmitting chains selectively arranged in operative engagement with said sprockets and respectively anchored adjustably at one end in predetermined spaced relation with one another on said fifth wheel and at the other end on said drum,
    the parts respectively being so conformed and arranged to operate whereby upon operator actuation of one hydraulic cylinder to move its associated piston rod in one direction force is transmitted through one chain and its associated sprockets to rotate said drum in one direction, said other hydraulic cylinder being actuated simultaneously to move its associated piston rod in another direction thereby to transmit force through another chain and its associated sprockets similarly to rotate said drum, said other chains and their associated sprockets being actuated correspondingly to release said drum so to rotate.

3. Mechanism according to claim 2 in which the longitudinal axes of the hydraulic cylinders are generally convergent toward the vertical axis of the idler sprockets.

4. Mechanism according to claim 1 in which the drum carries adapter means for receiving a plurality of pairs of chains in predetermined spaced relation with one another.

5. Mechanism for steering a tractor-drawn trailer unit comprising
    (a) a fifth wheel mounted on the tractor for oscillation about a generally horizontal axis extending longitudinally medianly thereof,
    (b) a generally gooseNecked element mounted on the trailer unit and having an end portion supported on said fifth wheel for pivotal movement relative thereto about a generally vertical axis,
    (c) a steering drum on said element and concentric with said axis,
    (d) a source of hydraulic power on said tractor,
    (e) a plurality of vertically spaced double-acting hydraulic power means on said fifth wheel in operative communication with said source,
    (f) power transmitting means operatively connecting said power means and said drum in adjustable torque transmitting relation for rotating the latter selectively in opposite directions relative to the fifth wheel,
    (g) said power transmitting means comprising a plurality of pairs of flexible power-transmitting means respectively operative upon said drum in adjustable torque-transmitting relation so that as one of a pair of said means pulls on said drum another thereof correspondingly slackens to allow turning of said drum,
    said power means being synchronized and the parts respectively being so conformed and arranged to operate under manual control whereby upon one of said power means being actuated to tauten one of its associated power transmitting means to rotate said drum in one direction, another of said power means is reversely actuated to tauten one of its associated power transmitting means additively to rotate said drum in said one direction, said other power transmitting means being correspondingly untautened to release said drum for rotation in said one direction whereby to maintain constant torque on said drum during rotation thereof.

6. Mechanism according to claim 5 in which the support for the gooseneck element comprises a king pin mounted on the fifth wheel for relative rotation therebetween and the steering drum is disposed co-axially with said king pin and said hydraulic power means are mounted on said fifth wheel in vertical and horizontal spaced relation with one another, said power transmitting means being disposed in corresponding spaced relation on said fifth wheel in adjustable relation therewith.

7. Mechanism according to claim 5 in which the power transmitting means comprise a plurality of chains anchored at one end thereof on said fifth wheel in longitudinally adjustable relation and at the other end thereof on said drum, said chains being arranged in pairs in relation to said power means, respectively, for pulling and slackening correspondingly to maintain constant torque on said drum during rotation thereof.

8. Mechanism according to claim 5 in which the hydraulic power means comprises a plurality of hydraulic cylinders having pistons with rods extending therefrom along the longitudinal axis of said cylinders and the power transmitting means comprise a plurality of pairs of spaced sprockets mounted on said rods for rotation about horizontally spaced axes perpendicular to said axis, and a plurality of chains selectively engaging said sprockets and other rotative means on said fifth wheel and respectively anchored at opposite ends thereof to said fifth wheel and said drum, whereby upon actuation of said piston rods in one direction longitudinally thereof one member of each pair of sprockets will travel along its associated chain to pull the same and thereupon to rotate said drum in one direction and the other member of each pair of sprockets will travel on its associated chain to slacken the same and thereupon to release said drum correspondingly so to rotate.

References Cited

UNITED STATES PATENTS 2,362,262  11/1944  French _____ 180—79.2
2,638,998  5/1953  Rockwell.
2,676,664  4/1954  Richter.

BENJAMIN HERSH, *Primary Examiner.*

J. H. BRANNEN, *Assistant Examiner.*